Jan. 21, 1969     E. L. CHINNOCK     3,423,593
OPTICAL BEAM POSITION SENSOR
Filed Oct. 28, 1966
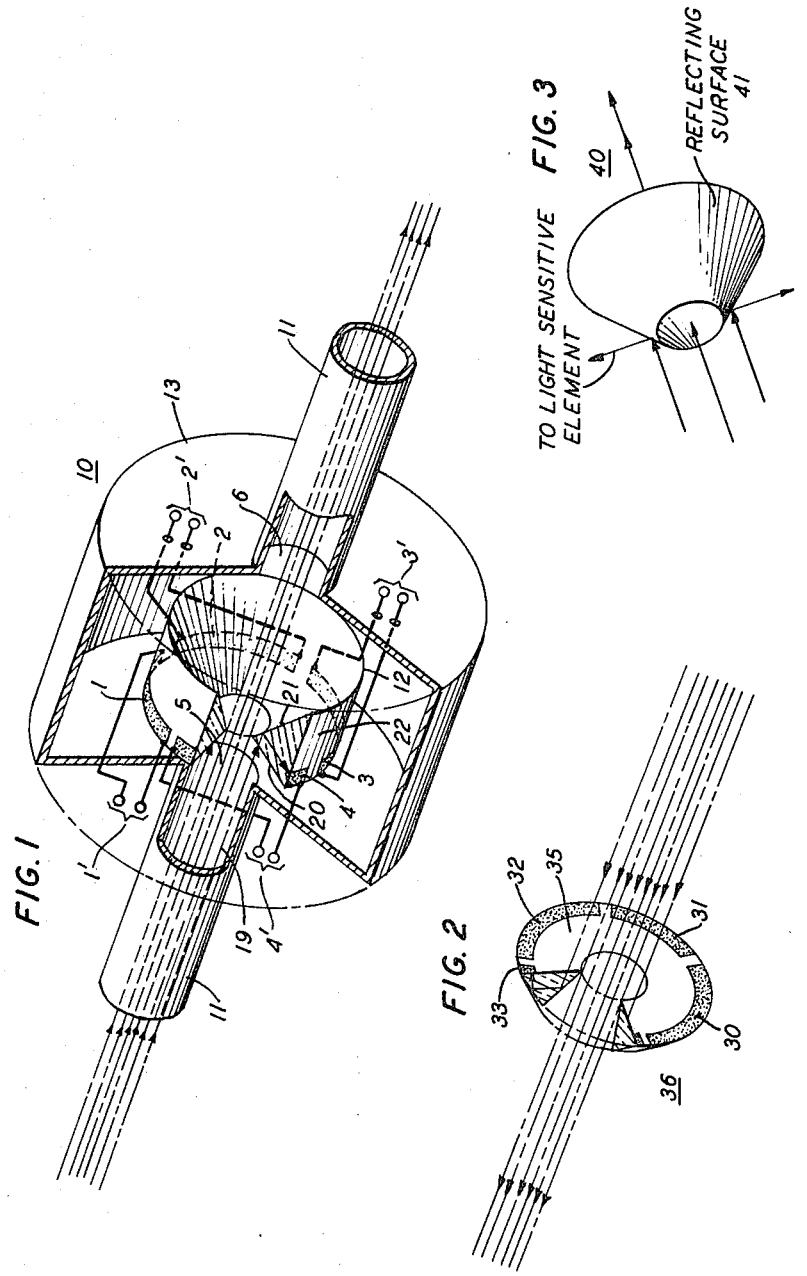
INVENTOR
E. L. CHINNOCK
BY
Sylvan Sherman
ATTORNEY

3,423,593
OPTICAL BEAM POSITION SENSOR
Edwin L. Chinnock, Rumson, N.J., assignor to Bell Telephone Laboratories, Incorporated, Murray Hill, Berkeley Heights, N.J., a corporation of New York
Filed Oct. 28, 1966, Ser. No. 590,380
U.S. Cl. 250—208                    8 Claims
Int. Cl. H01j 39/12

This invention relates to optical beam position sensing arrangements for use in optical waveguiding systems.

In an article by D. W. Berremen entitled "A Lens or Light Guide Using Convectively Distorted Thermal Gradients in Gases," published in the July 1964 issue of the Bell System Technical Journal, pages 1469–1475, there is described a thermal gaseous waveguide particularly adapted for the transmission of optical wave energy. It is characteristic of the waveguide described by Berremen that a radially varying index of refraction is established across the wavepath by thermal means as a way of guiding the optical wave energy propagating therealong.

In the copending application by E. A. J. Marcatili, Ser. No. 487,677, filed Sept. 16, 1964, and assigned to applicant's assignee, a thermal gaseous waveguide is described in which means are provided for both guiding an optical beam and for redirecting the beam, as required. This is accomplished by the use of two pairs of density control elements disposed about the periphery of the waveguide. Each pair of control elements produces a transverse density gradient in the waveguiding medium which can be resolved into two components. The first of these components is a radial density gradient and provides the primary waveguiding, or focusing, action. The second, or auxiliary component, is superimposed upon the radial component and operates in a manner to deflect the wave energy. By orienting the two auxiliary gradients at right angles to each other, and by controlling the density distribution along these two orthogonal directions, waveguiding corrections can be introduced into the wavepath to compensate for any deviation in the direction of propagation of the optical beam due, for example, to misalignment of the waveguide resulting from both intentional and unintentional bends in the system.

Information as to the nature of the waveguiding correction required is provided by optical sensing elements distributed about the wavepath. These monitor the direction of propagation of the optical beam and generate correcting signals which are coupled to the density control elements, and cause the auxiliary gradients to be varied in a manner so as to redirect the beam.

It is the broad object of the present invention to increase the sensitivity of the sensing elements used in the controlled guidance of optical beams.

In accordance with the invention, deflecting means are symmetrically disposed about an optical waveguide for the purpose of intercepting a fraction of the energy within the optical beam, and for directing the intercepted energy out of the waveguide and onto photosensitive elements. In one specific embodiment of the invention, the deflecting means comprises an annular prism about whose outer periphery four photosensitive elements are uniformly distributed. The beam to be monitored is directed through the aperture in the prism. When the beam is centered, equal amounts of energy are intercepted and projected upon the four elements, producing no net correction voltage. If, however, the beam is off-center, the energy intercepted by the prism and projected upon the respective photosensitive elements is not the same, producing a net correction voltage which is used, for example, to modify the density gradient across the wavepath and, thereby, to redirect the optical beam.

It is an advantage of the present invention that essentially all of the energy about the outer edge of the beam can be utilized to generate the correction signal without in any significant way interfering with the main portion of the beam.

These and other objects and advantages, the nature of the present invention, and its various features, will appear more fully upon consideration of the various illustrative embodiments now to be described in detail in connection with the accompanying drawings, in which:

FIG. 1 shows a beam position sensor in accordance with the invention using a right angle annular prism;

FIG. 2 shows an annular Porro prism for use in the invention; and

FIG. 3 shows an annular reflector for use in the invention.

Referring to the drawings, FIG. 1 shows an optical beam position sensor 10, in accordance with the invention, located along an optical waveguide 11. Waveguide 11 can be of the type described in the above-identified copending application by E. A. J. Marcatili, for example, or any other waveguide which includes adjustable means (not shown) for repositioning the direction of propagation of the wave energy being guided therein.

Sensor 10 comprises an annular right angle prism 12 disposed within a light-tight enclosure 13. Four photosensitive elements 1, 2, 3 and 4, which can be either photocells or photo-resistors, are symmetrically distributed about the outer periphery of prism 12, and are connected to four pairs of output terminals 1', 2', 3' and 4'. Terminals 1', 2', 3' and 4' permit coupling between the photosensitive elements and external beam position control means. Balance controls and other circuit components associated with the feedback circuit and connected between the photosensitive elements and the beam positioning means can also be located within enclosure 13 but have been omitted in order to simplify the drawing.

The photosensitive elements can be deposited directly upon prism 12 as a photoresistive film, for example, so as to be an integral part thereof, or they can be separate members placed immediately adjacent to the prism at 90 degree intervals.

The enclosure is provided with an input aperture 5 and an output aperture 6 in which adjacent ends of waveguide 11 terminate. The prism axis is coaxially aligned with the waveguide axis to permit uninterrupted propagation of wave energy therethrough.

It is the function of prism 12 to sense any deviation in the direction of propagation of an optical beam by intercepting some of the energy from within the beam and directing it onto the photosensitive elements. Thus, in the illustrative embodiment, any light, such as represented by a ray 19, incident upon prism surface 20, is totally internally reflected at a second surface 21, and leaves the prism through a third surface 22 about which the photosensitive elements 1, 2, 3 and 4 are located.

In operation, a properly aligned and formed beam, propagating along waveguide 11, enters enclosure 13 through aperture 5, propagates through prism 12, and leaves enclosure 13 through aperture 6. Ideally, essentially none of the energy in the beam is intercepted by the prism. In practice, however, some energy about the outer edges of the beam is intercepted and illuminates the photosensitive elements equally, resulting in no net correction signal being produced. If, however, the beam is misdirected, either because it is propagating at an angle to the guide axis, or because the beam axis is transversely displaced from the guide axis, the energy intercepted along different portions of the prism varies, and the photosensitive elements are unequally illuminated. The net correction signal generated in the control circuit under this condition acts upon the redirecting mechanism in the optical waveguide in a manner to reorient the beam. In one embodiment of the above-cited Marcatili application, the temperature of the heating elements is controlled by the correction signals.

By symmetrically centering the four photosensitive elements at 90 degree intervals about the prism, and by operating opposite pairs of light-sensitive elements as a unit, beam displacement along two mutually perpendicular directions can be detected and complete beam control obtained.

In the embodiment of FIG. 1, a right angle prism is used, and the intercepted wave energy is directed out of the wavepath at right angles to the incident energy as a result of internal reflection at surface 21. More generally, however, any annular arrangement of prisms and/or reflectors capable of intercepting and deflecting the wave energy to be monitored can be used for this purpose. Other examples of annular structures that can be used are illustrated in FIGS. 2 and 3. The former shows an annular Porro prism 36 in which the intercepted wave energy undergoes two internal reflections and is directed out of the prism in a direction parallel to the incident beam, but radially displaced. Thus, the photosensitive elements 30, 31, 32 and 33 are distributed about the outer edge of the incident face 35 of the prism.

FIG. 3 shows an annular mirror 40 in the shape of a truncated cone. The incident energy is reflected by the mirrored surface 41 and can be directed along any direction depending upon the angle the reflecting surface makes with the beam direction. The photosensitive elements are not shown in this figure, but would be located in a position to intercept the redirected wave energy.

In the various illustrative embodiments described, a total annular structure is shown for maximum sensitivity. However, it is apparent that less than a complete annulus can alternatively be used where less than maximum sensitivity is required. As an example, four separate right angle prisms and associated photosensitive elements, symmetrically distributed about the wavepath at 90 degree intervals will provide control signals for wave guidance in accordance with the invention. In addition, when photocells are used, they can be connected in a bridge configuration comprising a ring of oppositely poled cells. When so connected, the cells provide a pair of correction voltages which can be used to correct the beam position with respect to a pair of orthogonal axes that are rotated forty-five degrees with respect to the axes of symmetry of the light activating the photo-cells. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. In combination:
   an optical waveguide for guiding a beam of optical wave energy therealong;
   a beam position sensor disposed along said waveguide comprising wave deflecting means symmetrically disposed about said waveguide for intercepting a fraction of the energy of said beam and for directing said intercepted energy out of said waveguide;
   four photosensitive elements disposed about said sensor for receiving portions of said intercepted energy;
   and means for coupling between said elements and external beam position control means.
2. The combination according to claim 1 wherein said deflecting means comprises an annular right angle prism.
3. The combination according to claim 1 wherein said deflecting means comprises an annular Porro prism.
4. The combination according to claim 1 wherein said deflecting means comprises an annular mirror.
5. The combination according to claim 1 wherein said photosensitive elements are photo-cells.
6. The combination according to claim 1 wherein said photosensitive elements are photo-resistors.
7. The combination according to claim 1 wherein said deflecting means comprises an annular prism, and wherein said photosensitive elements are symmetrically distributed about said prism at 90 degree intervals.
8. The combination according to claim 1 wherein said deflecting means comprises four separate elements.

References Cited
UNITED STATES PATENTS

| | | | |
|---|---|---|---|
| 2,604,601 | 7/1952 | Menzel | 313—96 |
| 2,766,387 | 10/1956 | Bolsey | 250—203 |
| 3,229,102 | 1/1966 | Spencer et al. | 250—203 |
| 3,316,800 | 5/1967 | Kibler | 250—201 |

JAMES W. LAWRENCE, *Primary Examiner.*

C. R. CAMPBELL, *Assistant Examiner.*

U.S. Cl. X.R.

250—201, 203, 204; 313—96; 333—324; 88—14; 350—286